United States Patent
Tobolka

(10) Patent No.: US 6,195,965 B1
(45) Date of Patent: Mar. 6, 2001

(54) CONTAINER WITH DISPENSING SPOUT AND METHOD FOR MAKING SAME

(75) Inventor: Stefan Tobolka, Ingelwood (CA)

(73) Assignee: Arkmount Systems Inc., Toronto (CA)

(*) Notice: Subject to any disclaimer, the term of this patent is extended or adjusted under 35 U.S.C. 154(b) by 0 days.

(21) Appl. No.: 09/215,847

(22) Filed: Dec. 18, 1998

Related U.S. Application Data

(63) Continuation-in-part of application No. 09/162,613, filed on Sep. 29, 1998.

(51) Int. Cl.$^7$ .................. B65B 9/10; B65B 7/08
(52) U.S. Cl. ............... 53/451; 53/482; 53/375.2; 53/387; 53/551; 493/218; 493/936
(58) Field of Search .............. 53/451, 482, 551, 53/374.7, 375.2, 375.5, 387.1; 493/218, 936, 219

(56) References Cited

U.S. PATENT DOCUMENTS

| | | | |
|---|---|---|---|
| 2,339,896 | 1/1944 | Waters | 226/56 |
| 2,374,793 | * 5/1945 | Waters | 53/482 |
| 2,866,488 | 12/1958 | Thompson | 150/0.5 |
| 2,999,627 | 9/1961 | Reinhardt | 229/53 |
| 3,009,498 | 11/1961 | Fohr | 150/9 |
| 3,082,583 | * 3/1963 | Larson | 53/451 |
| 3,089,298 | * 5/1963 | Neundorf et al. | 53/374.7 |
| 3,325,961 | 6/1967 | Lindh et al. | 53/28 |
| 3,335,540 | * 8/1967 | Reil | 53/451 |
| 3,378,988 | 4/1968 | McClosky | 53/180 |
| 3,381,441 | 5/1968 | Condo, Jr. et al. | 53/24 |
| 3,387,701 | 6/1968 | Schneider et al. | 206/46 |
| 3,482,373 | 12/1969 | Morris | 53/112 |
| 3,488,915 | 1/1970 | Delestatius | 53/112 |
| 3,849,965 | 11/1974 | Dominici | 53/28 |
| 4,027,455 | * 6/1977 | Rausing et al. | 53/451 |
| 4,041,851 | 8/1977 | Jentsch | 93/35 SB |
| 4,129,976 | * 12/1978 | Grundler et al. | 493/936 |
| 4,361,235 | 11/1982 | Gautier | 206/527 |
| 4,384,440 | 5/1983 | Ohlsson | 53/412 |
| 4,406,646 | * 9/1983 | Jentsch | 493/936 |
| 4,464,156 | 8/1984 | Holmstrom | 493/194 |
| 4,566,249 | 1/1986 | Schwerdtel et al. | 53/55 |
| 4,649,696 | * 3/1987 | Brie et al. | 493/396 |
| 4,747,253 | 5/1988 | Schulte | 53/433 |
| 4,848,063 | 7/1989 | Niske | 53/451 |
| 5,031,386 | 7/1991 | Schneider | 53/551 |
| 5,170,609 | 12/1992 | Bullock et al. | 53/434 |
| 5,220,771 | 6/1993 | Burns | 53/551 |
| 5,378,065 | 1/1995 | Tobolka | 383/9 |
| 5,408,807 | 4/1995 | Lane, Jr. et al. | 53/551 |
| 5,454,208 | 10/1995 | Kawano | 53/410 |
| 5,715,656 | 2/1998 | Pearce | 53/451 |
| 5,755,076 | 5/1998 | Otsuka | 53/373.7 |

FOREIGN PATENT DOCUMENTS

| | | |
|---|---|---|
| 915519 | 1/1993 | (GB). |
| 2271753 | 4/1994 | (GB). |
| WO 97/19852 | 6/1997 | (WO). |

* cited by examiner

*Primary Examiner*—John Sipos
(74) *Attorney, Agent, or Firm*—Baker & Daniels

(57) ABSTRACT

A method for manufacturing a plurality of containers from a tube of flexible packaging material includes transversely severing the tube into a plurality of individual containers, each having a main body with two opposed pointed lower corners, pinching each pointed lower corner to collapse the corner into a flattened triangular shape while adding heat to the same in order to well the corner together in the flattened condition, and bending each flattened corner to lie under its respective main body, while the flattened corner still retains heat.

11 Claims, 4 Drawing Sheets

CONTAINER WITH DISPENSING SPOUT AND METHOD FOR MAKING SAME

CROSS-REFERENCE TO RELATED APPLICATION

This a continuation-in-part of U.S. patent application Ser. No. 09/162,613, filed on Sep. 29, 1998, in the name of Stefan Tobolka.

FIELD OF THE INVENTION

The present invention relates to containers and in particular to a container adapted to hold a fluid or liquid such as a beverage or the like. The present invention also relates to a method of forming fluid-filled containers from a tube of flexible material and to a method of forming a self-supporting fluid-filled container.

BACKGROUND OF THE INVENTION

In the application of which this is a continuation-in-part, the whole of which is incorporated herein by reference, there is disclosed a mechanism for forming a heat seal and a cut transversely of a tube of flexible packaging material, the mechanism including a carrier to contact the tube, heat sealing means on the carrier to form a heat seal across the tube when contact takes place, and a resistive wire on the carrier which can be energized to cut the tube when the carrier is in contact with the tube.

In the embodiments disclosed in the earlier application, the tube of flexible packaging material is severed, transversely to its direction of movement, into a plurality of identical containers each having a main body with two opposed lower pointed corners.

In the earlier application, a heat sealing and cutting apparatus downstream of the container forming apparatus is described. This apparatus includes mechanisms to collapse each pointed lower corner of the container into a flattened triangular shape and then heat the collapsed corner to weld the corner together in the flattened condition. The mechanisms incorporate resistive cutting ribbons adapted to sever the flattened triangular corners.

This continuation-in-part application is directed to a variant in terms of dealing with the opposed pointed lower corners of the container as manufactured, in which the corners are first pinched to collapse the corners into flattened triangular shapes while adding heat in order to weld the corners together in the flattened condition, this being followed by bending each flattened corner to lie under the respective main body of the container, while the flattened corner still retains heat. It is found that this step of bending the flattened corners, while they still retain heat, is sufficient for the flattened corners to remain in position in which they lie under the main body of the container.

GENERAL DESCRIPTION OF THE INVENTION

Accordingly, this invention provides a method of manufacturing a plurality of containers from a tube of flexible packaging material, the method comprising the steps:

transversely severing the tube into a plurality of individual containers each having a main body with two opposed lower pointed corners, pinching each pointed lower corner to collapse the corner into a flattened triangular shape while adding heat to the same in order to weld the corner together in the flattened condition, and bending each flattened corner to lie under its respective main body, while the flattened corner still retains heat.

Further, there is provided herein, in a method for the manufacture of a container possessing a main body with at least one lower pointed corner, the improvement comprising the steps:

pinching the pointed lower corner to collapse the corner into a flattened triangular shape while adding heat to the same in order to weld the corner together in the flattened condition, and bending the flattened corner to lie under its respective main body, while the flattened corner still retains heat.

Additionally, this invention provides, in a method for the manufacture, from a tube of flexible, heat-weldable packaging material, of a plurality of containers each having a main body with two opposed lower pointed corners, the improvement comprising the steps:

pinching each pointed lower corner to collapse the corner into a flattened triangular shape while adding heat to the same in order to weld the corner together in the flattened condition, and bending each flattened, heated corner to lie under its respective main body.

Moreover, this invention provides, for manufacturing a plurality of containers from a tube of flexible packaging material, an apparatus comprising:

severing means for transversely severing the tube into a plurality of individual containers each having a main body with two opposed pointed lower corners, pinching means for pinching each pointed lower corner to collapse the corner into a flattened triangular shape, heating means for heating each pointed lower corner in order to weld the corner together in a flattened condition, and bending means for bending each flattened corner to lie under its respective main body, while the flattened corner still retains heat.

Finally, this invention provides, in an apparatus for the manufacture of a container possessing a main body with at least one lower pointed corner, the improvement comprising:

pinching means for pinching the pointed lower corner to collapse the corner into a flattened triangular shape, heating means for adding heat to the same in order to weld the corner together in a flattened condition, and bending means for bending the flattened corner to lie under its respective main body, while the flattened corner still retains heat.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
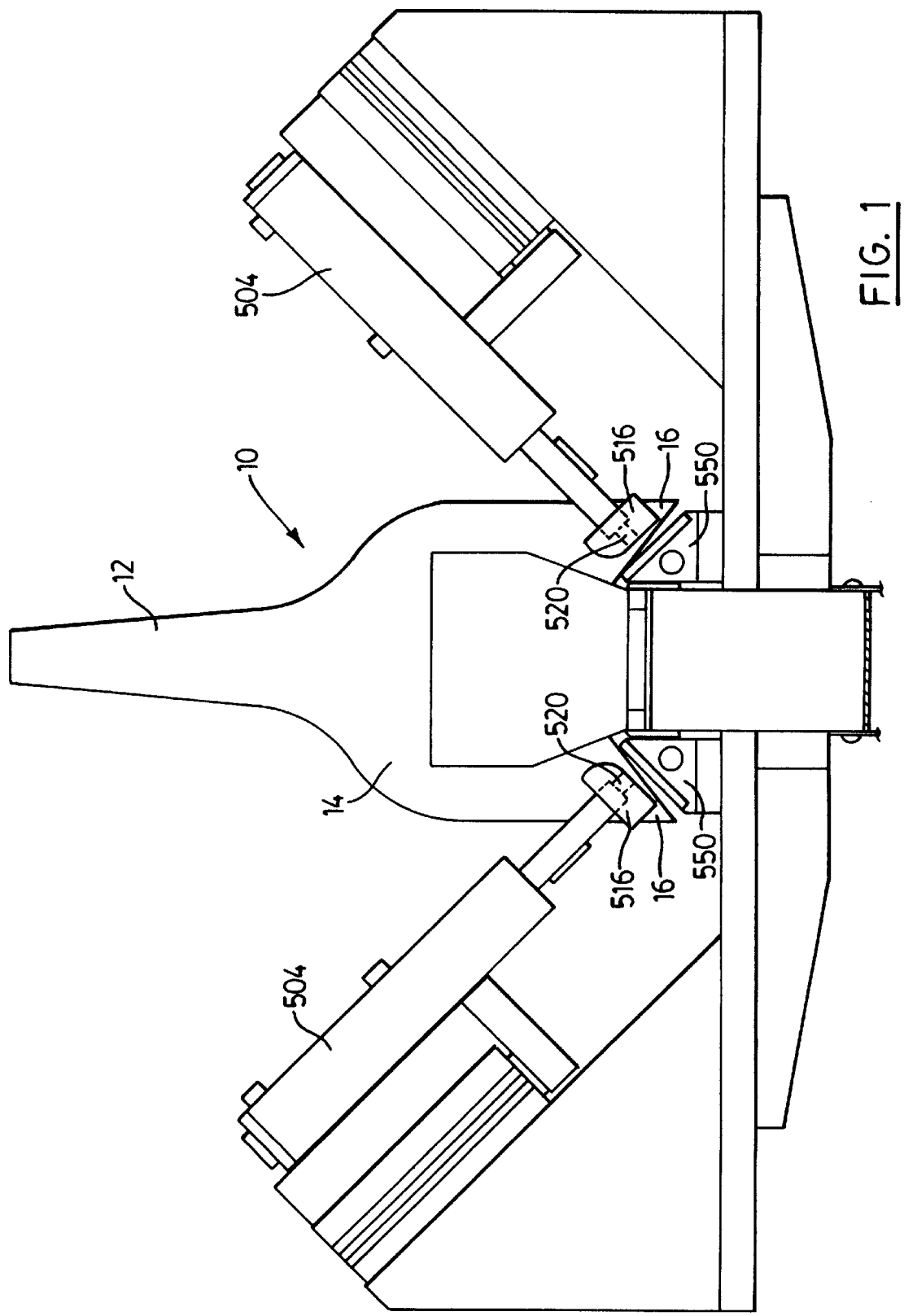
FIG. 1 is an elevational view showing a portion of an apparatus for manufacturing a plurality of containers, the portion being that which causes the pointed lower corners to collapse into a flattened triangular shape and to become welded together in the flattened condition.

Attention is directed first to FIG. 1, in which a container 10 has an elongate spout 12 and a main body 14 which terminates at the bottom end in two opposed pointed corners 16. Pneumatic air cylinders 504 can be actuated to bring assemblies 516 into contact with the opposed bottom corners 16, thereby to pinch the corners of the container between the assemblies and wedge-shaped backing plates 550. This expels fluid from the pinched corners 16 into the main body 14.

Each assembly 516 includes a heat sealing mechanism which is extended through the opening 520 to contact the pinched corner and is then energized to create a heat seal, i.e., to weld the respective corner together in the flattened condition.

Figure 3:
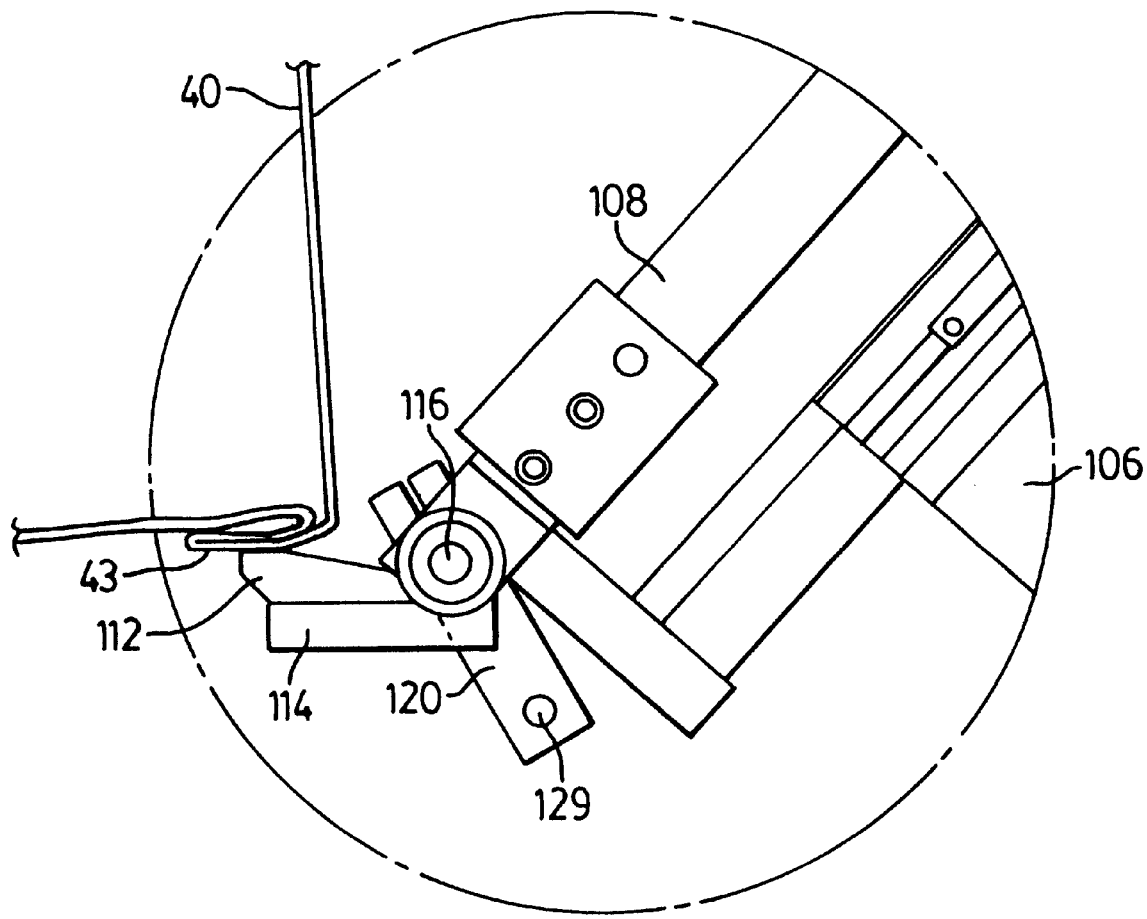
FIG. 3 is a detail of FIG. 2, showing a portion thereof in rotated condition and the effect of such rotation on the container.
Figure 4:
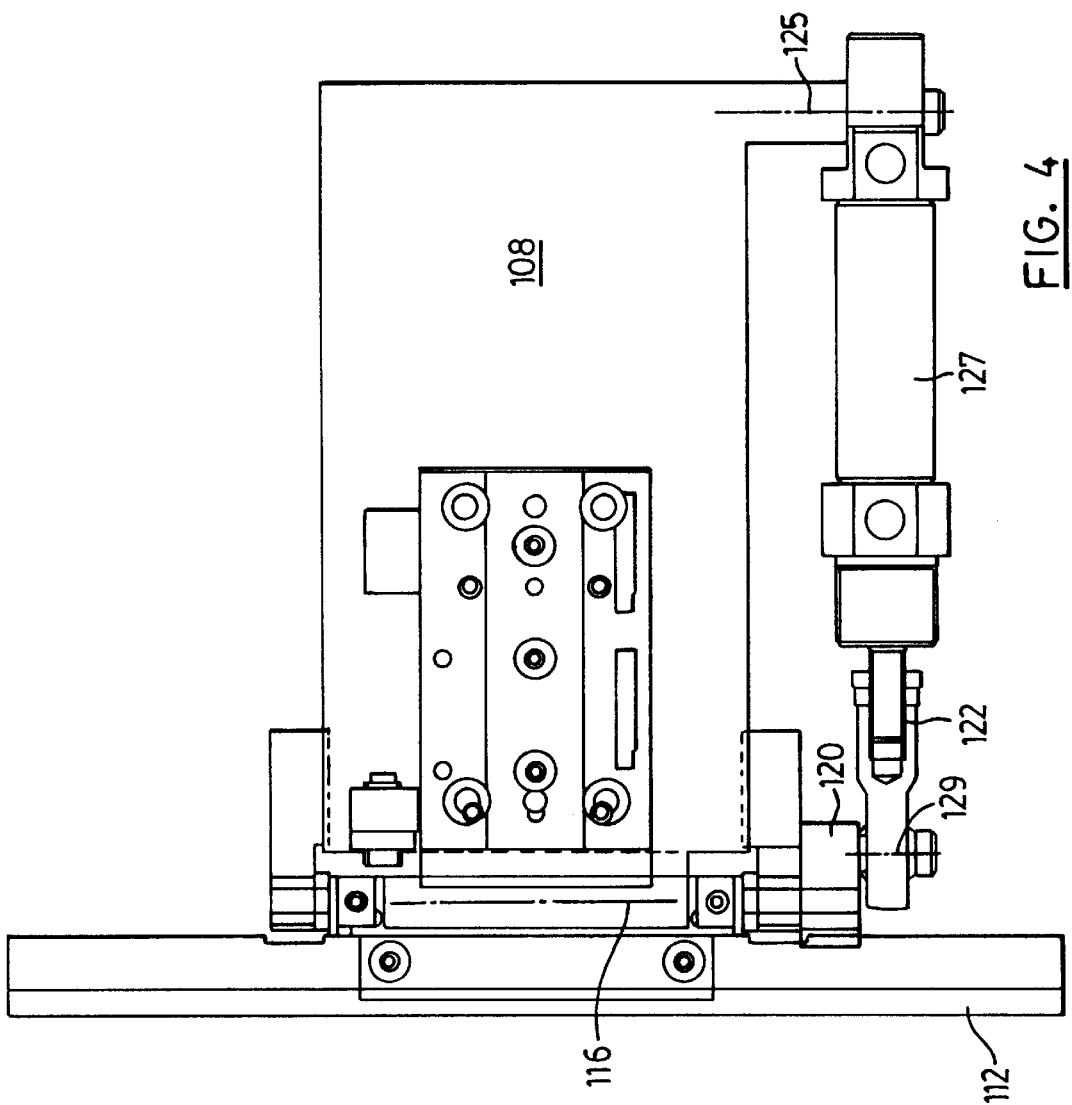
FIG. 4 is an oblique elevational view of one of the components shown in FIG. 2.

While the disclosure of the application of which this is a continuation-in-part then describes the energization of a central cutting ribbon in order to cut the pinched corners away to remove them from the containers, the process in accordance with the present application does not include the same step. Instead, the containers are brought to the next sequential station, represented by FIGS. 2, 3 and 4, where two tucking mechanisms 100 are illustrated, one on either side of the container 40.

As can be seen, each mechanism 100 is braced and supported on an angulated substrate 102, through a mounting plate 104 set at the same angle. Secured to the plate 104 is a mounting block 106 with respect to which a plate 108 is adapted to slide (in a direction parallel with the plate 104).

Attention is directed to the container 40, which includes outwardly projecting corners 43 that have a flattened triangular shape, and which still contain heat from the previous flattening process (FIG. 1).

At the bottom of the plate 108 is located a finger 112 secured to an arm 114, the latter being mounted for pivotal motion about an axis 116 at the bottom inner end of the plate 108. Thus, the finger 112 is pivotally mounted with respect to the axis 116 on the plate 108.

Also fixed with respect to the axis 116 is an oblique arm 120 which is pivotally connected to one end of a shaft 122 of which the other end is connected in turn to a pivot location 125. Hydraulic or electrical means 127 are provided to cause elongation or shortening of the distance between the pivot location 125 and the location 129 at which the shaft 127 is pivotally connected to the oblique arm 120.

The mechanism just described in such that, as the shaft 127 is elongated, it will cause the oblique arm 120 to rotate in the clockwise direction about the axis 116, thus causing the finger 112 to likewise move in the clockwise direction about the pivot point 116.

Figure 2:
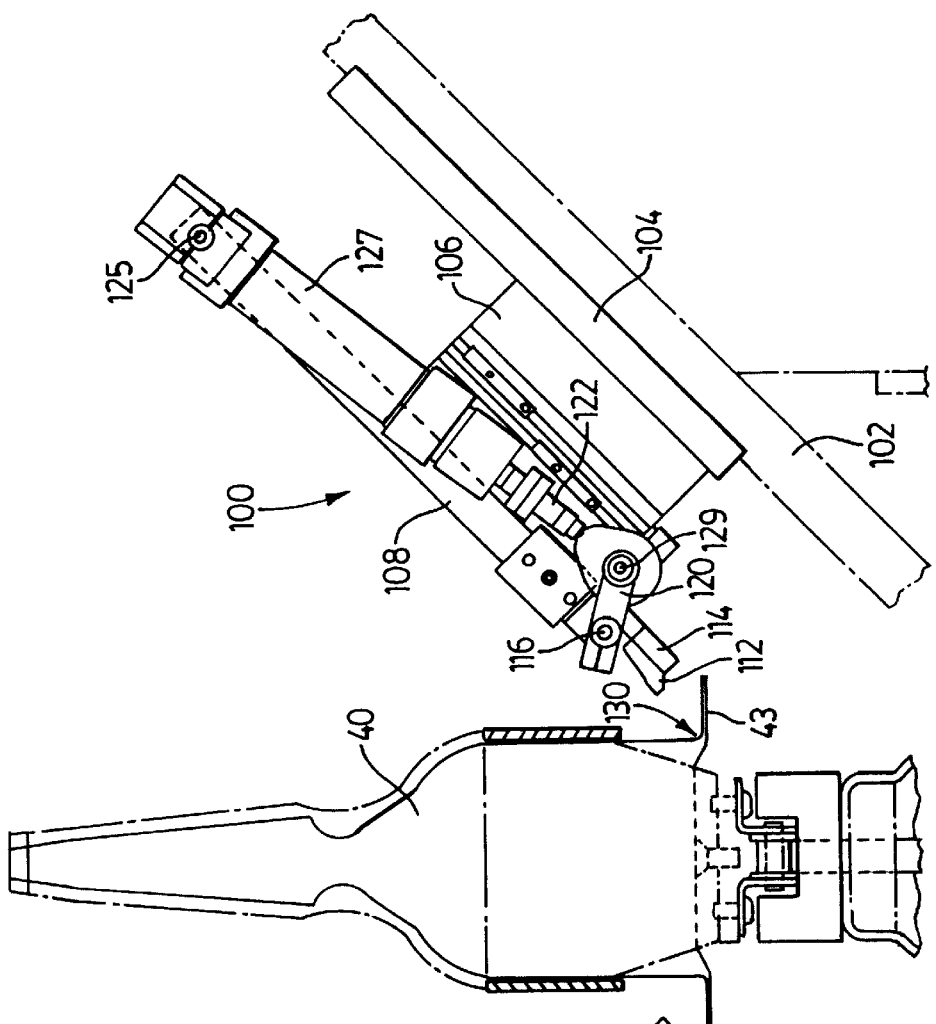
FIG. 2 is a view similar to FIG. 1, but showing a different station, in which the flattened welded corners are bent under the main body of the respective container.

In operation, when the container 40 has achieved the position shown in FIG. 2, each plate 108, with the various arms, shafts, etc. in the positions shown in FIG. 2, moves downwardly and inwardly so that the finger 112 can force the flattened triangular corner 43 to a position where it extends on an angle downwardly and inwardly (though not yet against the bottom of the container 40). Then, the shaft 127 is extended in order to swing the oblique arm 120 and the finger 112 clockwise about the axis 116. The finger 112 remains in contact with the flattened triangular corner 43 during this phase, and will now push the flattened triangular corner upwardly against the bottom of the container 40 (see FIG. 3). So long as the flattened triangular corner 43 has retained a sufficient portion of the heat used to weld it in the flat condition, it will now adopt its inwardly extending position beneath the main body of the container as a permanent configuration. Moreover, its hinge line, shown in FIG. 2 at the numeral 130 will help to provide stability to the container 40 when it is stored upright.

While one embodiment of this invention has been illustrated in the accompanying drawings and described hereinabove, it will be evident to those skilled in the art that changes and modifications may be made therein without departing from the essence of the invention, as set forth in the appended claims.

THE EMBODIMENTS OF THE INVENTION IN WHICH AN EXCLUSIVE PROPERTY OR PRIVILEGE IS CLAIMED ARE DEFINED AS FOLLOWS:

1. A method of manufacturing a plurality of containers from a tube of flexible packaging material, the method comprising the steps:

transversely sealing and severing the tube into a plurality of individual containers each having a main body with two opposed pointed lower corners;

pinching each pointed lower corner to collapse the corner into a flattened triangular shape while adding heat to the same in order to weld the corner together in the flattened condition; and bending each flattened corner to lie under the main body of its respective container, while the flattened corner still retains heat and holding said flattened corner beneath the main body until it cools so that the flattened corner remains beneath the main body.

2. A method for the manufacture of a container possessing a main body with a pair of lower pointed corners to make the container self-supporting, the method comprising the steps:

pinching the pointed lower corners to collapse each corner into a flattened triangular shape while adding heat to the same in order to weld the corner together in the flattened condition; and bending the flattened corners to lie under the main body, while the flattened corners still retain heat and holding said flattened corners beneath the main body until they cool so that the flattened corners remain beneath the main body.

3. The method claimed in claim 2, in which the step of pinching and the step of bending are accomplished sequentially at stations on a path along which the container is moved.

4. An apparatus for the manufacture of a container possessing a main body with a pair of opposed lower pointed corners to make the container self-supporting, the apparatus comprising:

pinching means for pinching the pointed lower corners to collapse each corner into a flattened triangular shape;

heating means for adding heat to the collapsed corners in order to weld each corner together in a flattened condition; and bending means for bending each flattened corner to lie under the main body, while the flattened corner still retains heat and holding the flattened corner beneath the main body until it cools to that the flattened corner remains beneath the main body.

5. The apparatus claimed in claim 4, in which the pinching means and the bending means are disposed sequentially at stations on a path along which the container moves.

6. A method of forming a self-supporting fluid-filled container having a body with an internal reservoir filled with fluid and a narrow spout in fluid communication with said body, said body having two opposed pointed lower corners, said method comprising the steps of:

pinching each pointed lower corner to collapse each corner into a flattened portion;

heat sealing each flattened portion to weld each flattened portion in the flattened condition; and folding each flattened portion underneath the body while each flattened portion still retains heat from the heat sealing so that each flattened portion remains beneath the body when each flattened portion cools.

7. The method of claim 6 wherein the heat sealing and folding steps are performed sequentially at stations on path along which the container is moved.

8. The apparatus as claimed in claim 4 wherein the bending means includes fingers moveable to contact the flattened corners and fold the flattened corners beneath the main body.

9. An apparatus for forming a self-supporting fluid-filled container having a main body with a pair of opposed lower pointed corners, the apparatus comprising:

a pinching mechanism to contact and pinch each lower corner and collapse each corner into a flattened condition;

a heat sealing mechanism energizeable to heat seal each flattened corner to weld each flattened corner in a flattened condition;

a corner folding mechanism downstream of said heat sealing mechanism, said corner folding mechanism being actuable to contact each flattened corner while the flattened corner retains heat and fold the flattened corner beneath the main body after it cools; and a drive to advance the container from the heat sealing mechanism to the corner folding mechanism.

10. The apparatus as claimed in claim 9 wherein the corner folding mechanism includes fingers moveable to contact and fold the flattened corners.

11. The apparatus as claimed in claim 10 wherein said heat sealing mechanism passes through openings in said pinching mechanism to contact and heat seal the flattened corners.

* * * * *

UNITED STATES PATENT AND TRADEMARK OFFICE
CERTIFICATE OF CORRECTION

PATENT NO. : 6,195,965 B1
DATED : March 6, 2001
INVENTOR(S) : Stefan Tobolka

It is certified that error appears in the above-identified patent and that said Letters Patent is hereby corrected as shown below:

<u>Title page,</u>
Item [75], Inventor: please delete "Stefan Tobolka, Ingelwood (CA)" and substitute therefor -- Stefan Tobolka, Ontario (CA) --

Signed and Sealed this

Second Day of October, 2001

Attest:

*Nicholas P. Godici*

NICHOLAS P. GODICI
*Acting Director of the United States Patent and Trademark Office*

*Attesting Officer*